(12) United States Patent
Kaneko

(10) Patent No.: US 10,077,075 B2
(45) Date of Patent: Sep. 18, 2018

(54) VEHICLE LOWER SECTION STRUCTURE

(71) Applicant: TOYOTA JIDOSHA KABUSHIKI KAISHA, Toyota-shi (JP)

(72) Inventor: Tsuneaki Kaneko, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 22 days.

(21) Appl. No.: 15/247,118

(22) Filed: Aug. 25, 2016

(65) Prior Publication Data

US 2017/0066482 A1 Mar. 9, 2017

(30) Foreign Application Priority Data

Sep. 4, 2015 (JP) ................................ 2015-174907

(51) Int. Cl.
| | | |
|---|---|---|
| *B62D 21/11* | (2006.01) | |
| *B62D 21/15* | (2006.01) | |
| *B60G 21/055* | (2006.01) | |
| *B62D 29/00* | (2006.01) | |
| *B62D 25/20* | (2006.01) | |

(52) U.S. Cl.
CPC .......... *B62D 21/11* (2013.01); *B60G 21/0551* (2013.01); *B60G 21/0555* (2013.01); *B62D 21/155* (2013.01); *B62D 25/2009* (2013.01); *B62D 29/008* (2013.01); *B60G 2204/1222* (2013.01); *B60G 2206/50* (2013.01)

(58) Field of Classification Search
CPC .. B62D 21/11; B62D 21/155; B62D 25/2009; B62D 29/008; B62D 27/023; B60G 21/0551; B60G 21/0555; B60G 2206/50; B60G 2204/1222
See application file for complete search history.

(56) References Cited

U.S. PATENT DOCUMENTS

| | | | | |
|---|---|---|---|---|
| 4,844,506 A | * | 7/1989 | Moriguchi | B60G 17/0162 280/124.106 |
| 5,251,932 A | * | 10/1993 | Ide | B60G 21/0551 180/427 |
| 5,362,094 A | * | 11/1994 | Jensen | B60G 21/0555 280/124.107 |

(Continued)

FOREIGN PATENT DOCUMENTS

| | | | | | |
|---|---|---|---|---|---|
| JP | 10024861 A | * | 1/1998 | ......... | B60G 21/0551 |
| JP | 10217741 A | * | 8/1998 | ......... | B60G 21/0551 |
| JP | 10258763 A | * | 9/1998 | ......... | B60G 21/0551 |

(Continued)

*Primary Examiner* — Laura Freedman
(74) *Attorney, Agent, or Firm* — Oblon, McClelland, Maier & Neustadt, L.L.P.

(57) ABSTRACT

A vehicle lower section structure includes: a suspension member including a side rail extending in a vehicle front-rear direction, the side rail including a front joint portion and a rear joint portion, the front joint portion being disposed on a front side of the rear joint portion in the vehicle front-rear direction; a securing member joined to the side rail at the front joint portion and the rear joint portion; and a stabilizer secured to the side rail by the securing member. The side rail includes a low-strength portion provided between the front joint portion and the rear joint portion and the low-strength portion has a strength lower than a strength of the front joint portion and the rear joint portion.

19 Claims, 15 Drawing Sheets

(56) References Cited

U.S. PATENT DOCUMENTS 5,565,251 A * 10/1996 Tang .................. B29C 47/0019
267/141.2
7,726,672 B2 * 6/2010 Yamagishi ......... B60G 21/0551
280/124.109

FOREIGN PATENT DOCUMENTS

| JP | 2000108633 A | * | 4/2000 | ......... B60G 21/0551 |
|----|--------------|---|--------|------------------------|
| JP | 2004262387 A | * | 9/2004 | |
| JP | 2010-89549   |   | 4/2010 | |
| JP | 2012046070 A | * | 3/2012 | |
| JP | 2012-91693   |   | 5/2012 | |

* cited by examiner

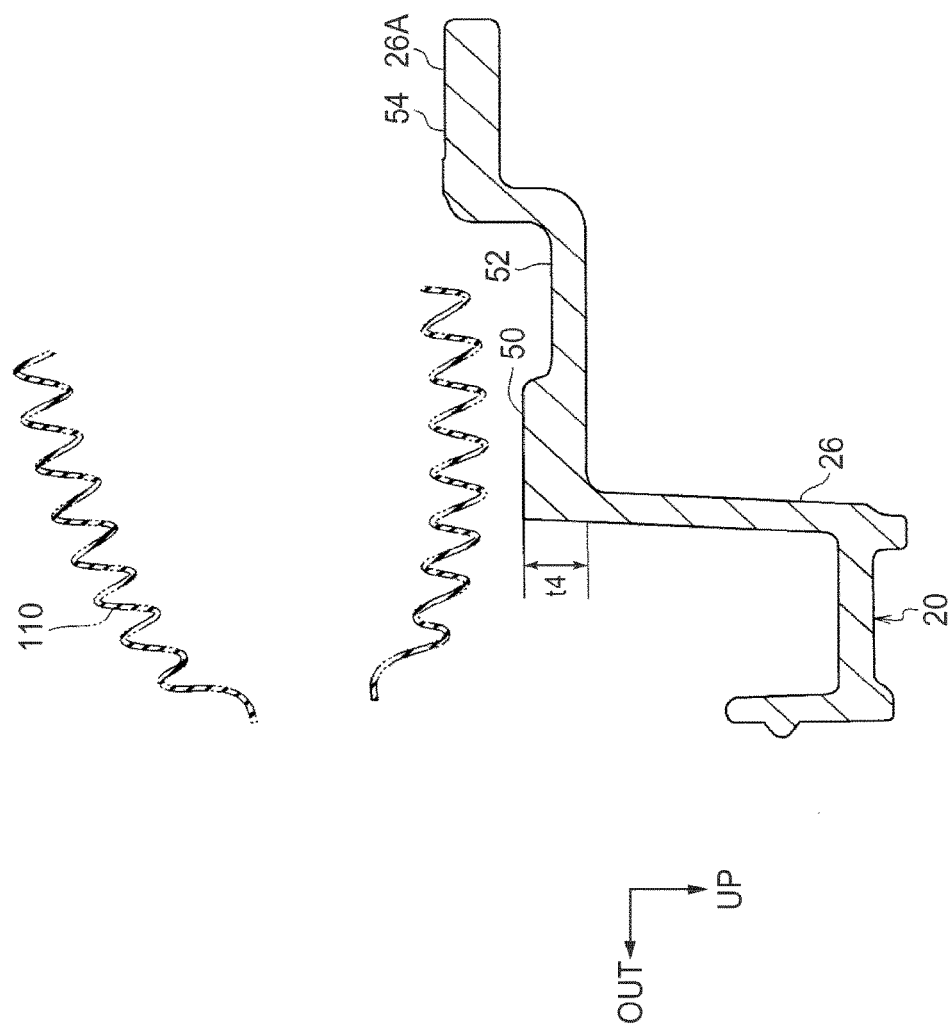

VEHICLE LOWER SECTION STRUCTURE

INCORPORATION BY REFERENCE

The disclosure of Japanese Patent Application No. 2015-174907 filed on Sep. 4, 2015 including the specification, drawings and abstract is incorporated herein by reference in its entirety.

BACKGROUND OF THE INVENTION

1. Field of the Invention

The invention relates to a vehicle lower section structure.

2. Description of Related Art

Japanese Patent Application Publication No. 2010-089549 discloses a stabilizer mounting structure that includes a pair of side members running in a vehicle front-rear direction, a rear cross member running in a vehicle width direction and connecting the pair of side members, a pair of lower arms swingably supported by the pair of side members respectively and respectively supporting a pair of wheels W, and a stabilizer connecting suspensions of the pair of wheels. In this prior art, the side members each have a stabilizer mounting portion protruding upward or downward, and each stabilizer mounting portion is interposed between fixing portions of the side member and the lower arm, and a connection portion of the side member and the rear cross member.

Another related technique is disclosed in Japanese Patent Application Publication No. 2012-091693.

SUMMARY OF THE INVENTION

In securing the stabilizer on an upper surface of an end portion of the rear cross member of the suspension member as described in JP 2010-089549 A, the stabilizer is required not to interfere with a multiplicity of members above the rear cross member. A large stabilizer such as an active stabilizer including an electrically-controlled actuator, therefore, might be difficult to mount.

Also, when a stabilizer having a high roll stiffness is fixed to the suspension member, a load input from the stabilizer to the suspension member increases, so that the plate thickness of the suspension member needs to be increased. The thicker suspension member, however, might be less deformable during a crash, and to be decreased in impact absorbing performance. Thus, a stabilizer having a high roll stiffness might be difficult to mount.

The aspect of the invention provides a vehicle lower section structure that is improved in mountability of a stabilizer while ensuring a desired impact absorbing performance of a suspension member.

A vehicle lower section structure according to an aspect of the invention includes: a suspension member including a side rail extending in a vehicle front-rear direction, the side rail including a front joint portion and a rear joint portion, the front joint portion being disposed on a front side of the rear joint portion in the vehicle front-rear direction; a securing member joined to the side rail at the front joint portion and the rear joint portion; and a stabilizer secured to the side rail by the securing member. The side rail includes a low-strength portion provided between the front joint portion and the rear joint portion and the low-strength portion has a strength lower than a strength of the front joint portion and the rear joint portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a sectional view corresponding to the sectional view of FIG. 3D also illustrating with an imaginary line (double dot-and-dash line) a tie rod end boot at the highest position within a movable range of the tie rod end boot;

DETAILED DESCRIPTION OF EMBODIMENTS

A vehicle lower section structure according to an embodiment of the invention will be described using FIGS. 1 to 15.

Arrows FR, UP, and OUT that are shown as appropriate in the figures respectively denote forward in a vehicle front-rear direction, upward in a vehicle up-down direction, and outward in a vehicle width direction. In the following description, the words front and rear, upper and lower, inner, outer, left, and right respectively mean front and rear sides in the vehicle front-rear direction, upper and lower sides in the vehicle up-down direction, inner, outer, left, and right sides in the vehicle width direction, unless otherwise specified.

<Structure>

Figure 1:
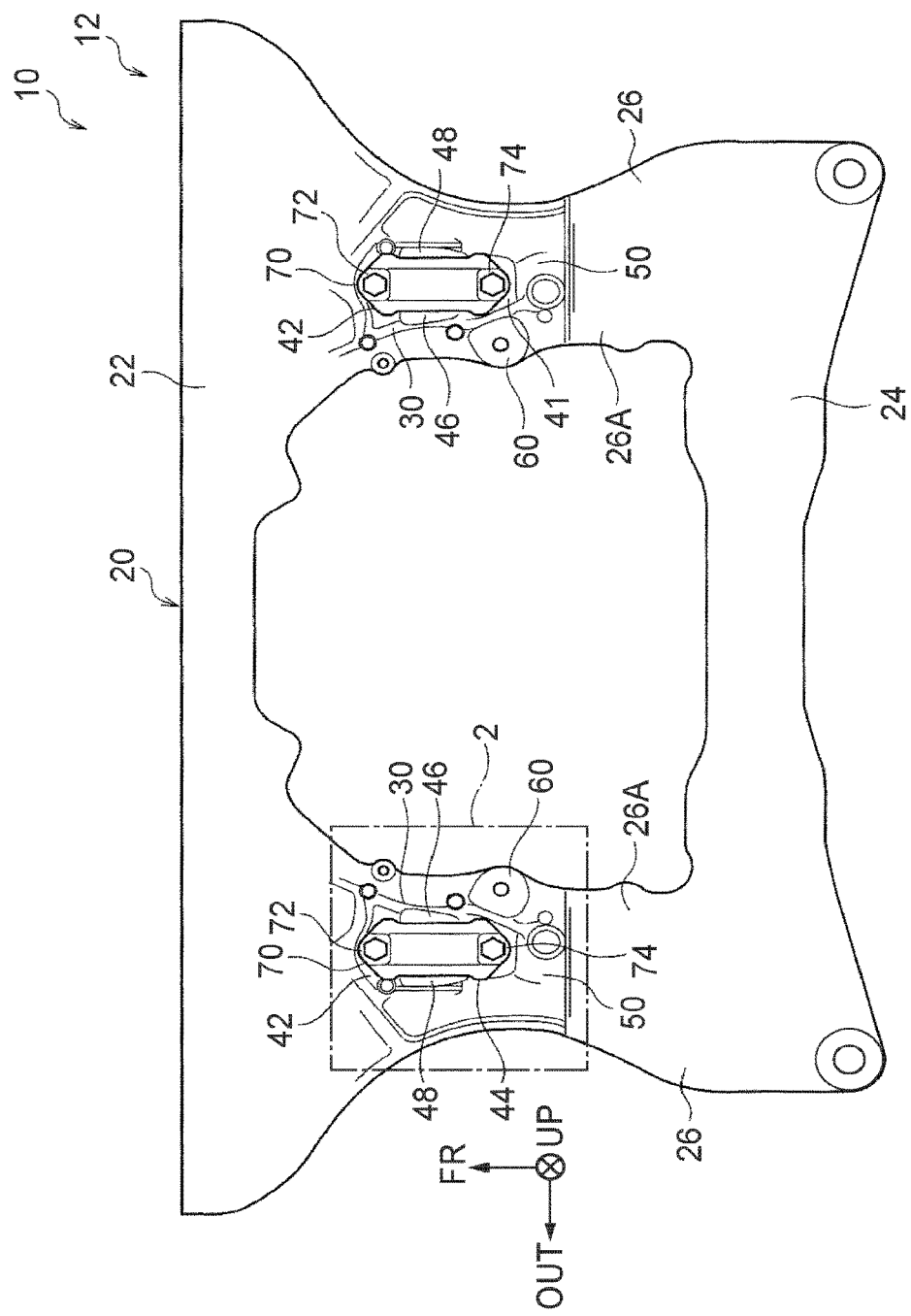
FIG. 1 is a plan view of a suspension member positioned at a lower front portion of a vehicle to which a vehicle lower section structure of an embodiment of the invention is applied, as seen from a vehicle up-down direction lower side.

A vehicle 12 to which a vehicle lower section structure 10 according to the embodiment shown in FIG. 1 is applied has a suspension member 20 at a lower front portion of the vehicle. The suspension member 20 of the embodiment is a casting made of an alloy mainly containing aluminum.

The suspension member 20 has on both vehicle width direction outer sides a pair of side rails 26 extending in the vehicle front-rear direction. The suspension member 20 is formed by laying a front cross member 22 and a rear cross member 24 extending in the vehicle width direction, across the side rails 26, and has a generally rectangular frame-like shape in a plan view. Four corner portions of the suspension member 20 are joined to front side members (not shown) arranged at both vehicle width direction side end portions of the vehicle 12 in the vehicle front-rear direction. In FIG. 1, portions other than the relevant portion of the invention are only shown in an outline and ribs and other configurations are omitted.

Figure 2:
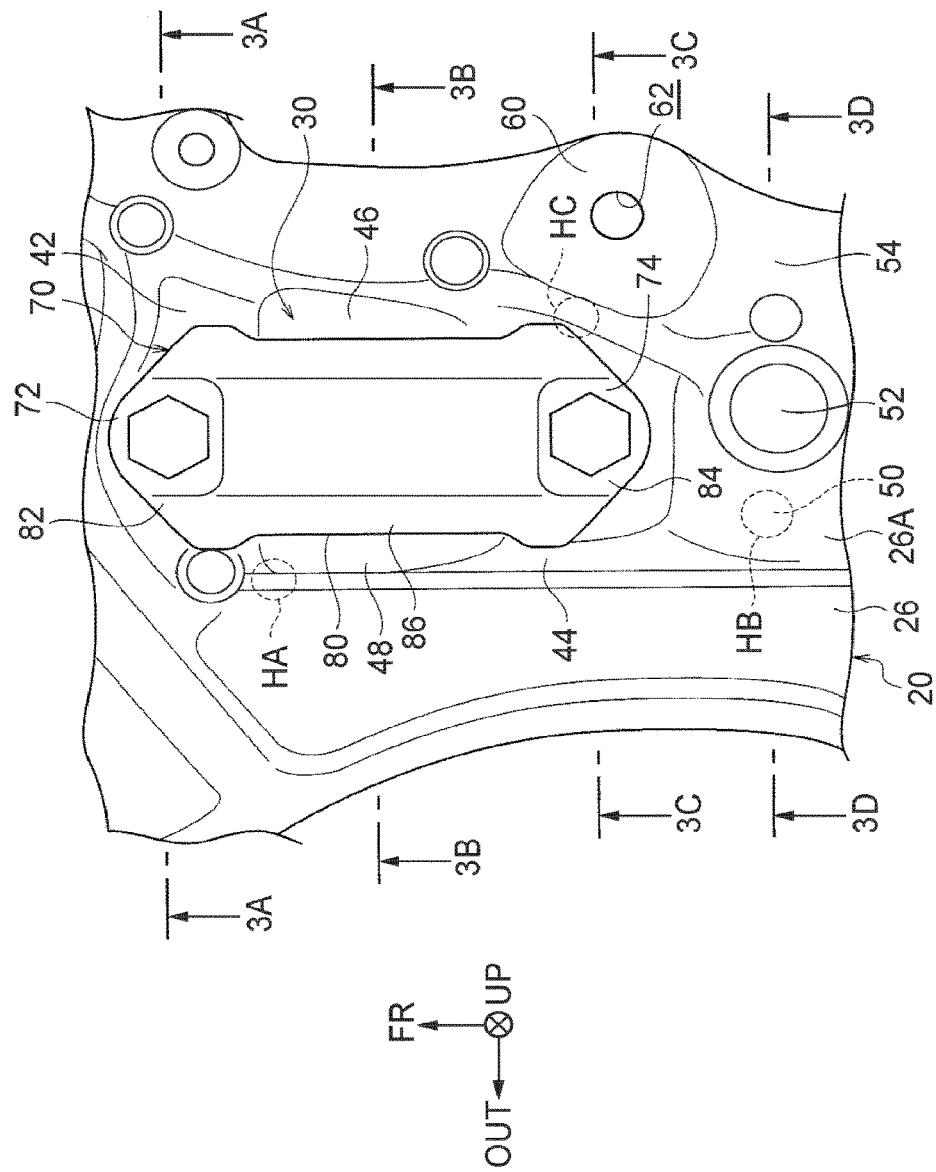
FIG. 2 is an enlarged plan view of a portion enclosed by a dot-and-dash line in FIG. 1 (enclosed portion 2)

As shown in FIGS. 1 and 2, each side rail 26 of the suspension member 20 has a stabilizer mounting portion 30 on a lower surface 26A at a middle portion of the side rail 26 in the vehicle front-rear direction. A stabilizer bracket 70 is bolted to the stabilizer mounting portion 30. The figures other than FIG. 1 illustrate the relevant portion of the left side rail 26 (on the right side in the vehicle 12) shown in FIG. 1. The relevant portion of the right side rail 26 (on the left side in the vehicle 12) shown in FIG. 1 has the same structure as that in the left side rail 26 except that they are symmetrical to each other.

The stabilizer mounting portion 30 of the side rail 26 has a front joint hole 32 (see FIG. 3A) and a rear joint hole 34 (see FIGS. 3C and 5) that are spaced apart from each other in the vehicle front-rear direction.

As shown in FIGS. 1, 2, and 6 to 8, a front end portion 72 and a rear end portion 74 of the stabilizer bracket 70 that secures a stabilizer 100 (see FIG. 6) are respectively bolted to the front joint hole 32 (see FIG. 3A) and the rear joint hole 34 (see FIGS. 3C and 5) of the stabilizer mounting portion 30.

Figure 6:
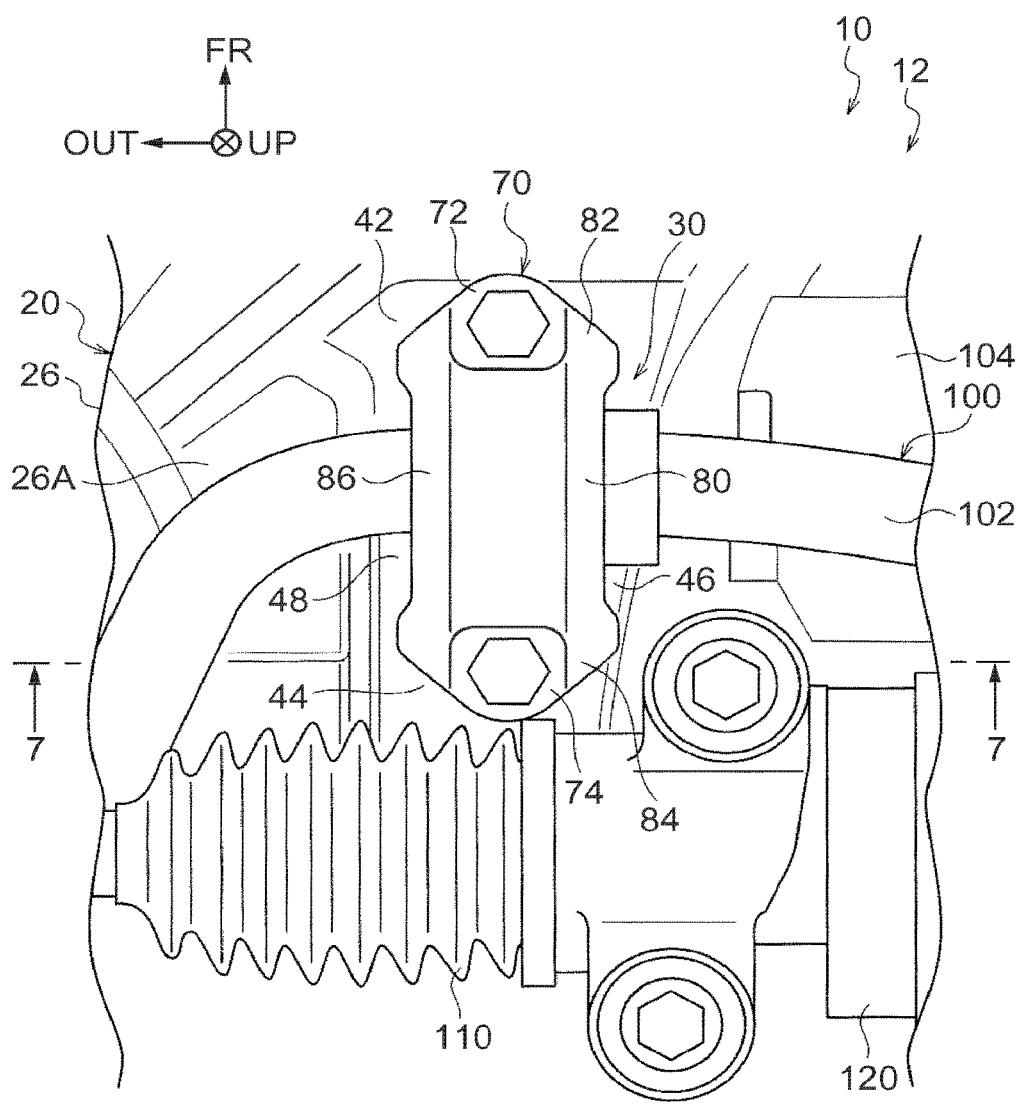
FIG. 6 is a plan view of the side rail corresponding to FIG. 2 with a stabilizer, the tie rod end boot, and an electric power steering mounted.

As shown in FIG. 6, the stabilizer 100 in the embodiment is an active stabilizer including a stabilizer main body 102 and an electrically-controlled actuator 104. The stabilizer 100 connects suspensions of a pair of left and right wheels not shown and inhibits roll of the vehicle 12. FIG. 6 shows the same portion as in FIG. 2 but also illustrates variable components including the stabilizer 100 arranged on the side rail.

Figure 8A:
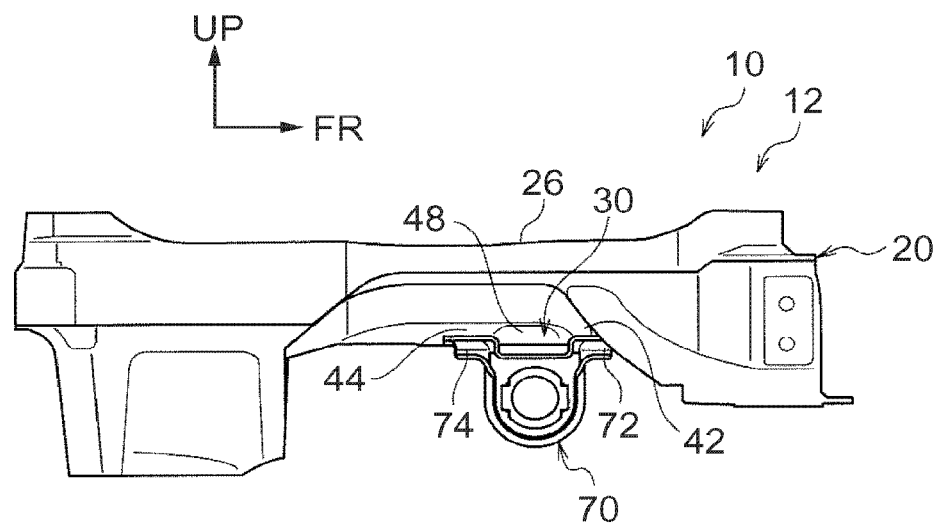
FIG. 8A is a side view of a portion of the side rail where a stabilizer bracket is joined.
Figure 8B:
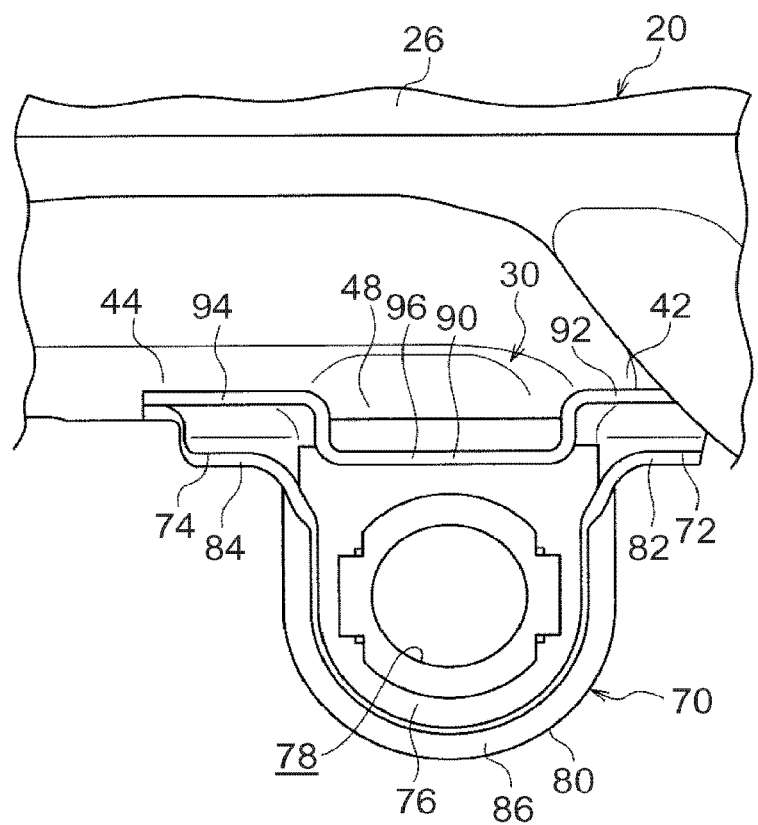
FIG. 8B is an enlarged view of FIG. 8A.
Figure 9:
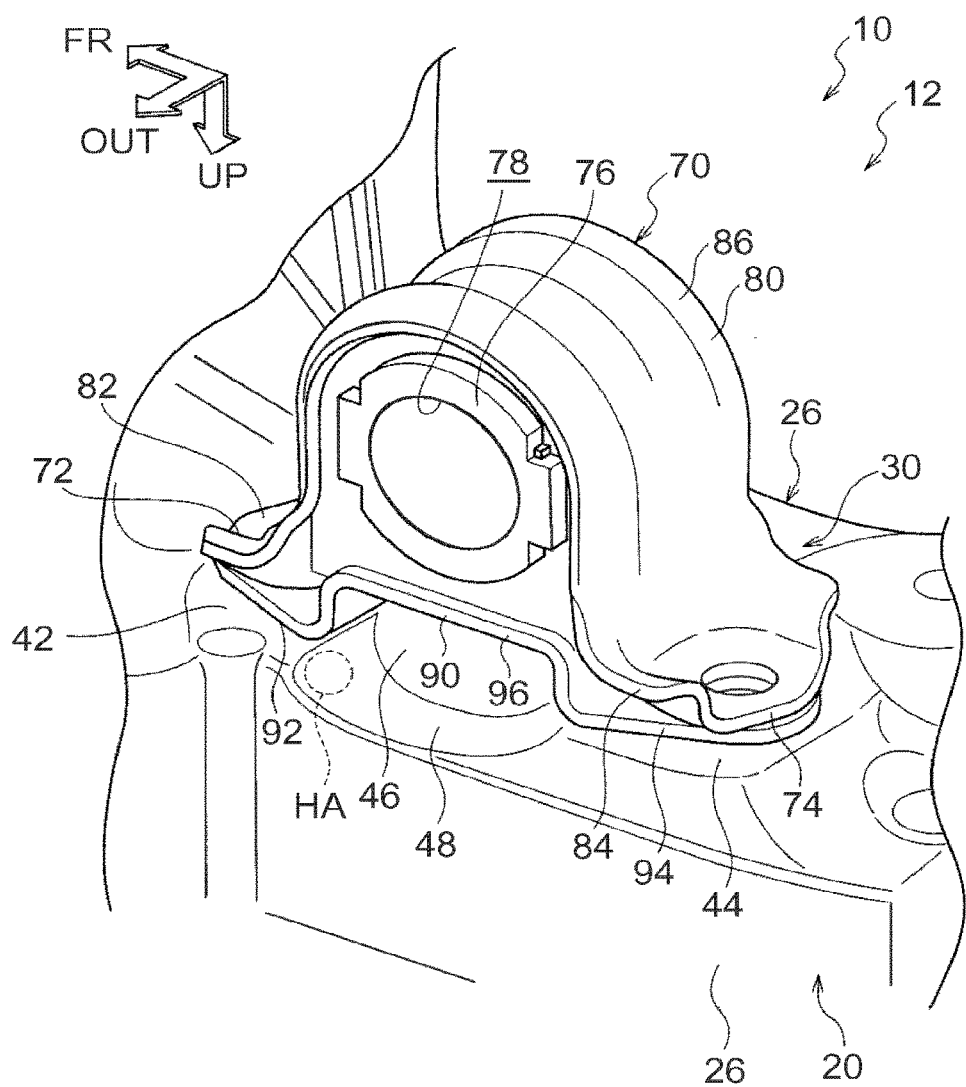
FIG. 9 is a perspective view of the portion of the side rail where the stabilizer bracket is joined as seen obliquely upward from below.

As shown in FIGS. 8 and 9, the stabilizer bracket 70, an example of a securing member, includes a bracket lower 80 and a bracket upper 90. As shown in FIGS. 8B and 9, the bracket lower 80 is formed by a U-shaped body portion 86 and flange portions 82, 84 extending in the vehicle front-rear direction. The bracket upper 90 is formed by a body portion 96 and flange portions 92, 94 extending in the vehicle front-rear direction, and has a hat shape in a side view.

A stabilizer bush 76 is provided between the body portion 86 of the bracket lower 80 and the body portion 96 of the bracket upper 90. The flange portions 82, 84 are respectively aligned to the flange portions 92, 94 to integrate the bracket lower 80 and the bracket upper 90. The integrated flange portion 82 and the flange portion 92 form the front end portion 72 and the integrated flange portion 84 and the flange portion 94 form the rear end portion 74.

Figure 10:
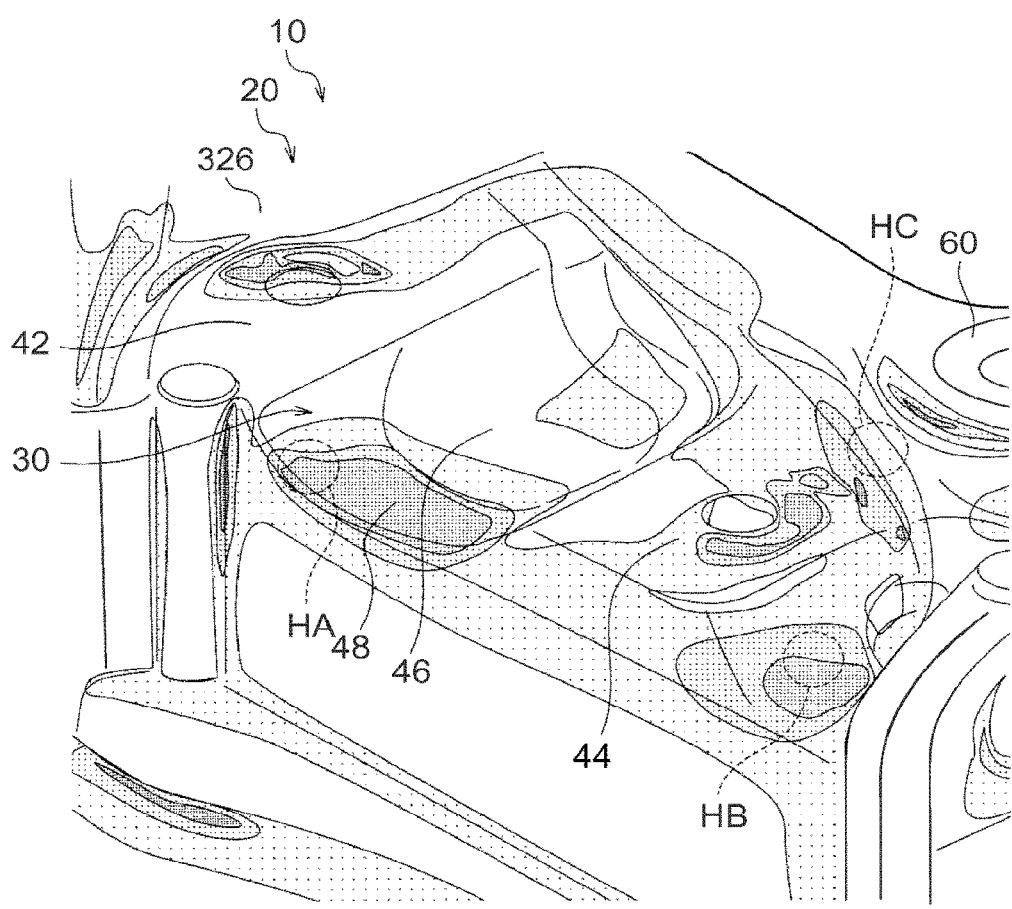
FIG. 10 shows stress distribution at a relevant portion of the side rail in the suspension member of the embodiment.

As shown in FIGS. 2, 9, and 10, a portion of the stabilizer mounting portion 30 on the side rail 26 of the suspension member 20 where the front joint hole 32 (FIG. 3A) is formed and the front end portion 72 of the stabilizer bracket 70 is bolted is called a front joint portion 42. Similarly, a portion of the stabilizer mounting portion 30 where the rear joint hole 34 (see FIGS. 3C and 5) is formed and the rear end portion 74 of the stabilizer bracket 70 is bolted is called a rear joint portion 44. A portion of the stabilizer mounting portion 30 between the front joint portion 42 and the rear joint portion 44 is called a middle portion 46.

Figure 5A:
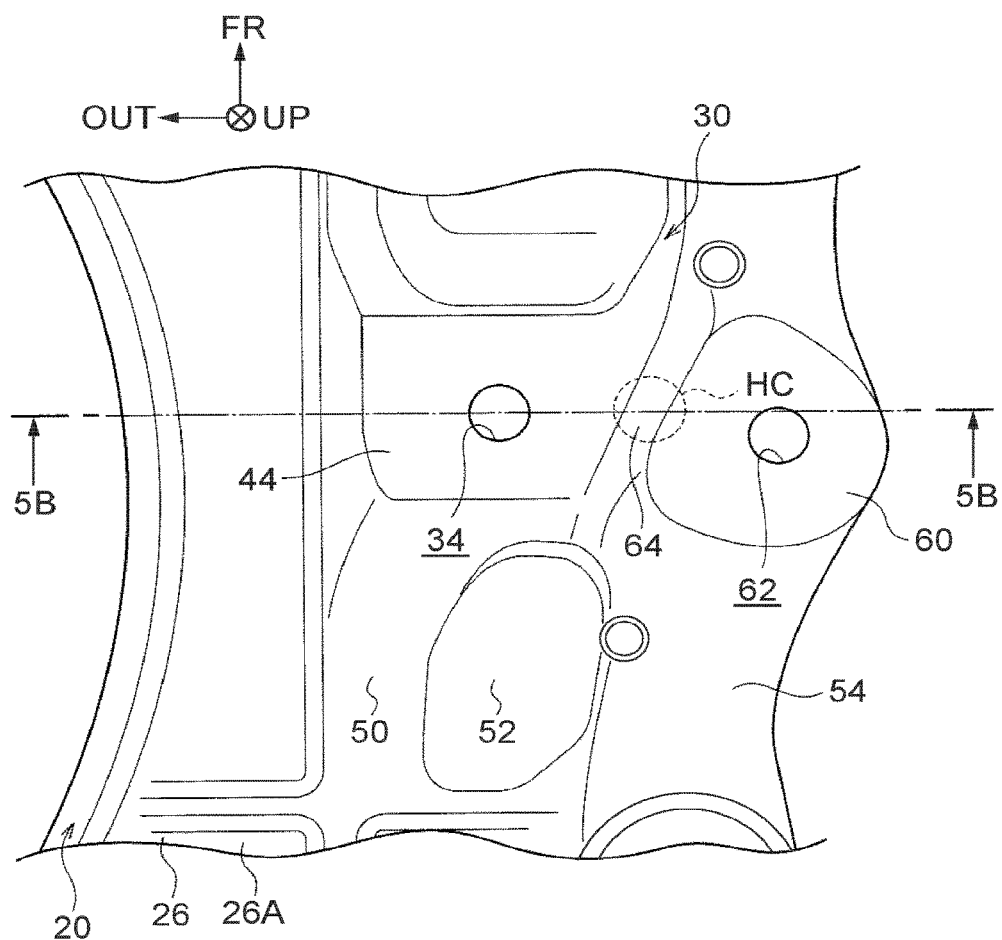
FIG. 5A is an enlarged plan view of a portion along the line 3C-3C in FIG. 2.
Figure 5B:
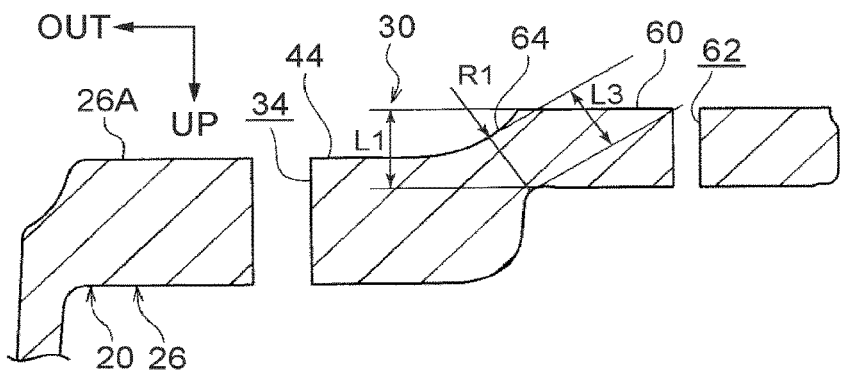
FIG. 5B is a sectional view taken along the line 5B-5B in FIG. 5A.
Figure 7:
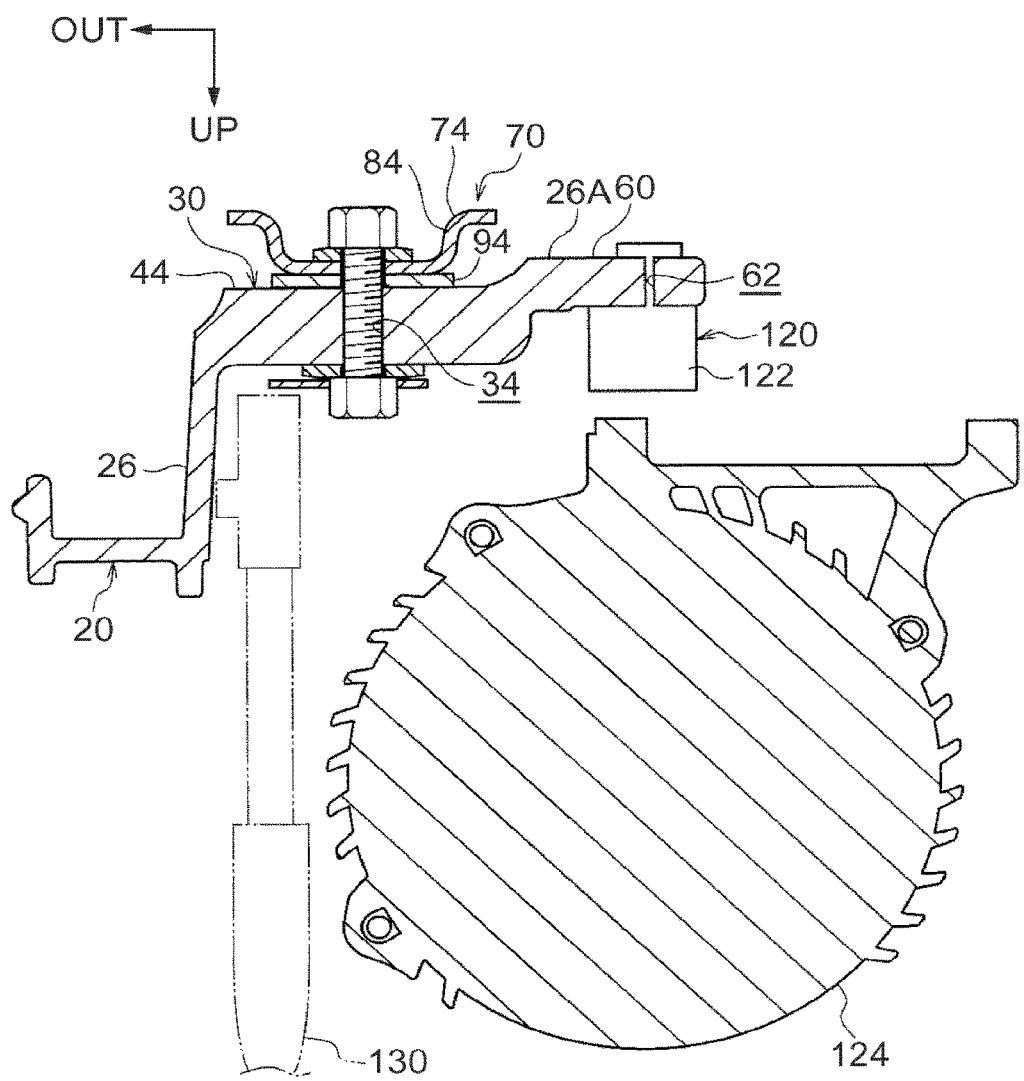
FIG. 7 is a sectional view taken along the line 7-7 in FIG. 6.

Here, FIG. 3A, FIG. 3B, FIG. 3C, and FIGS. 3D and 4 are sectional views respectively taken along the line 3A-3A, 3B-3B, 3C-3C, and 3D-3D in FIG. 2, each illustrating the side rail 26 with the stabilizer bracket 70 removed. The line 5B-5B in FIG. 5A and the line 7-7 in FIG. 6 are drawn at the same position as that of the line 3C-3C in FIG. 2. FIG. 5A is a plan view of the side rail 26 with the stabilizer bracket 70 removed, FIG. 5B shows the same portion as that in FIG. 3C but also shows a gearbox mounting portion 60 to be described later, and FIG. 7 shows the same portion as that in FIG. 5B but also shows the stabilizer bracket 70, a gearbox 122 to be described later, and other components.

Figure 3A:
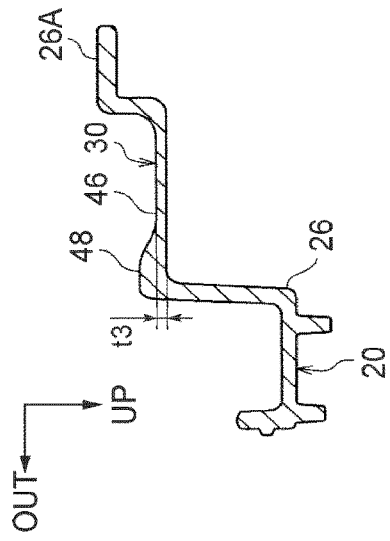
FIG. 3A is a sectional view of a side rail taken along the line 3A-3A in FIG. 2, with no stabilizer bracket joined.
Figure 3B:
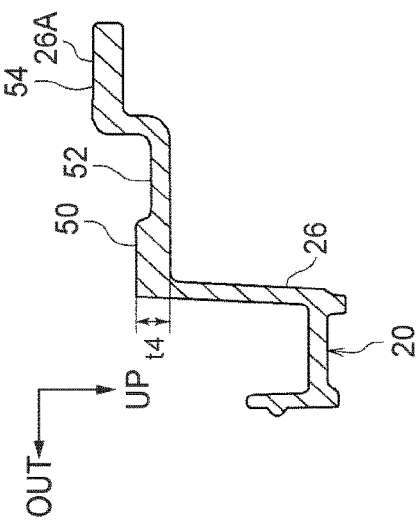
FIG. 3B is a sectional view of the side rail taken along the line 3B-3B in FIG. 2, with no stabilizer bracket joined.
Figure 3C:
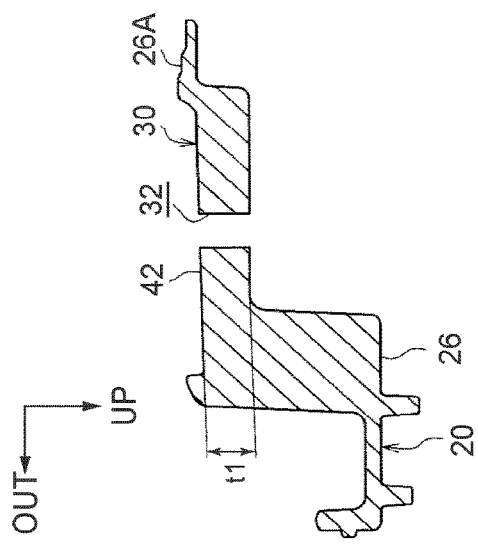
FIG. 3C is a sectional view of the side rail taken along the line 3C-3C in FIG. 2, with no stabilizer bracket joined.

A thickness t1 of the front joint portion 42 shown in FIG. 3A and a thickness t2 of the rear joint portion 44 shown in FIG. 3C are greater than a thickness t3 of the middle portion 46 shown in FIG. 3B. In other words, the front joint portion 42 and the rear joint portion 44 are stronger than the middle portion 46. That is, the middle portion 46 has a lower strength. In the embodiment, the thickness t1 of the front joint portion 42 is the same as the thickness t2 of the rear joint portion 44. Accordingly, the thicknesses t1, t2, t3 are in a relationship of t1=t2>t3.

As shown in FIGS. 2, 3B, 9, and 10, at a vehicle width direction outer area of the middle portion 46 in the stabilizer mounting portion 30 is formed a thick rib portion 48 (FIG. 3B) as an example of a reinforcing portion. The rib portion 48 is formed along the vehicle front-rear direction such that the rib portion 48 connects the front joint portion 42 (FIG. 3A) and the rear joint portion 44 (FIG. 3C) as shown in FIG. 2. Here, as shown in FIGS. 9 and 10, the rib portion 48 has a concavely curved profile protruding upward in the vehicle up-down direction.

Figure 3D:
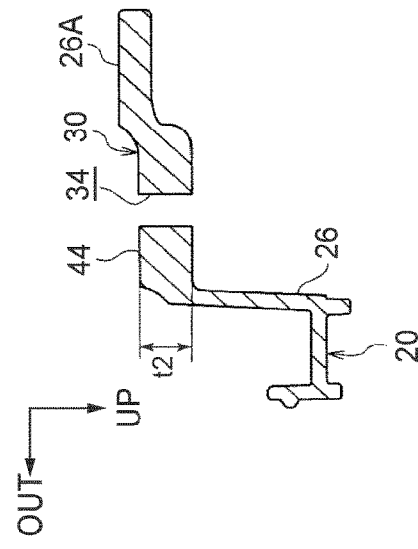
FIG. 3D is a sectional view of the side rail taken along the line 3D-3D in FIG. 2, with no stabilizer bracket joined.

A thick portion 50 as in FIGS. 3D and 4 is formed on a rear side of the rear joint portion 44 of the stabilizer mounting portion 30 as shown in FIG. 2. A concave portion 52 is formed on a vehicle width direction inner side of the thick portion 50, and a stepped portion 54 is formed on an inner side of the concave portion 52. The stepped portion 54 is positioned on a vehicle front-rear direction rear side of the gearbox mounting portion 60 to be described later, in the vicinity of the gearbox mounting portion 60 as shown in FIG. 2.

The thickness t4 of the thick portion 50 is less than the thickness t1 of the front joint portion 42 (FIG. 3A) and the thickness t2 of the rear joint portion 44 (FIG. 3C), but greater than the thickness t3 of the middle portion 46 (FIG. 3B). That is, the thicknesses t1 to t4 are in a relationship of t1=t2>t4>t3. The thick portion 50 is wider than the rear joint portion 44 (FIG. 3C) and thus has a larger cross-sectional area than the rear joint portion 44.

As shown in FIG. 6, a tie rod end boot 110 is placed on a lower side of the side rail 26 of the suspension member 20, on a vehicle front-rear direction rear side of the stabilizer bracket 70 and the stabilizer 100. A rack parallel-type electric power steering 120 is placed on an inner side of the tie rod end boot 110, on a vehicle width direction inner side of the side rail 26.

As shown in FIG. 4, the thick portion 50 has a thickness (height) that does not interfere with the tie rod end boot 110. FIG. 4 illustrates the tie rod end boot 110 at the highest position within a movable range (a position nearest to the side rail 26).

As shown in FIGS. 2 and 5A, a gearbox mounting portion 60 is provided on a vehicle width direction inner side of the rear joint portion 44 in the side rail 26 of the suspension member 20. The gearbox mounting portion 60 has a circular shape in a plan view. The gearbox mounting portion 60 is formed to expand downward in the vehicle up-down direction as shown in FIG. 5B and has a mounting hole 62 at the central portion of the gearbox mounting portion 60 as shown in FIGS. 2, 5A, and 5B. As shown in FIGS. 5A and 5B, an arc-shaped boundary area between the rear joint portion 44 and the gearbox mounting portion 60 is called a boundary portion 64.

Figure 14A:
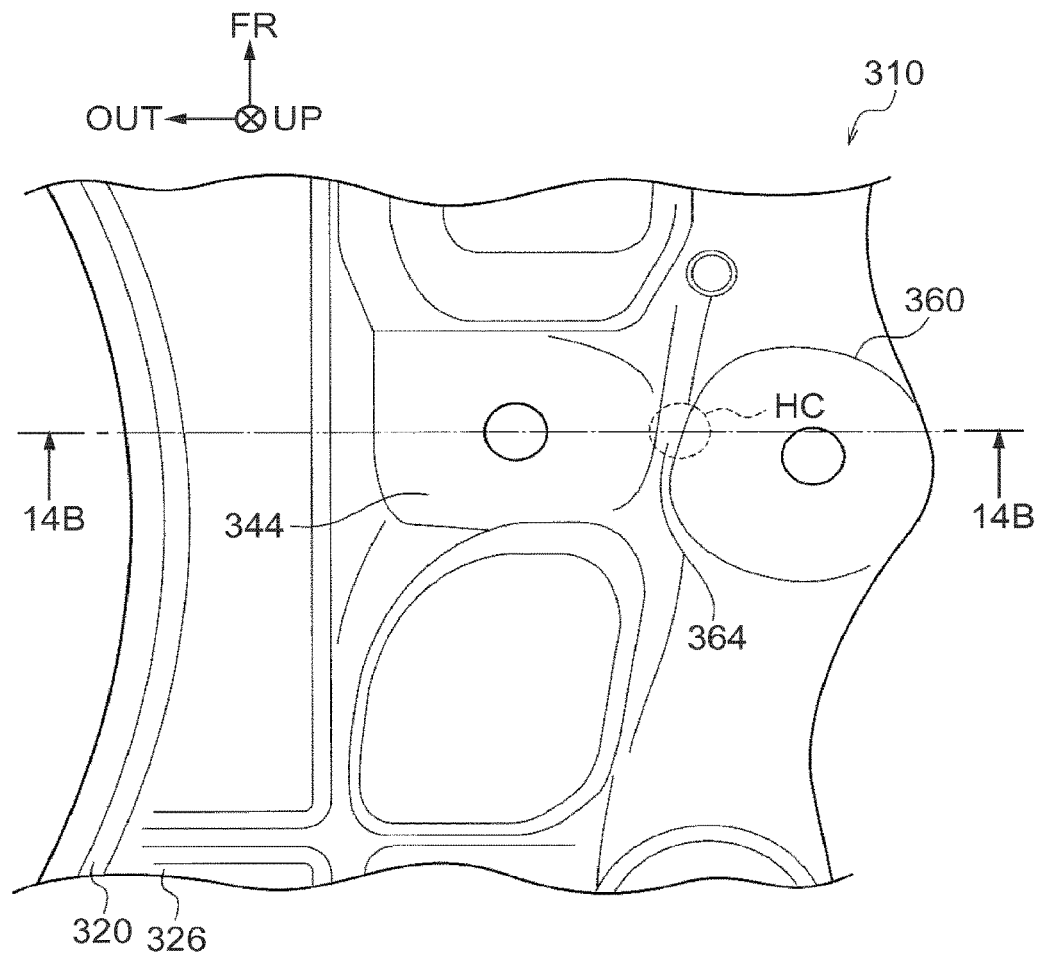
FIG. 14A is an enlarged plan view corresponding to FIG. 5A, illustrating a portion of the side rail in the suspension member of the comparative example.

FIG. 14 illustrates a rear joint portion 344 and a gearbox mounting portion 360 in a side rail 326 of a suspension member 320 of a vehicle lower section structure 310 according to a comparative example of the embodiment. An arc-shaped boundary area between the rear joint portion 344 and the gearbox mounting portion 360 is called a boundary portion 364.

Figure 14B:
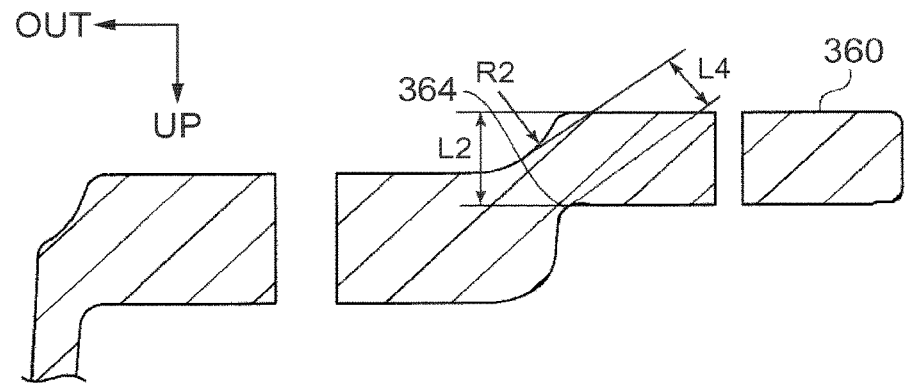
FIG. 14B is a sectional view taken along the line 14B-14B in FIG. 14A.

A level difference L1 between the rear joint portion 44 and the gearbox mounting portion 60 in the embodiment shown in FIG. 5B is less than a level difference L2 between the rear joint portion 344 and the gearbox mounting portion 360 in the comparative example shown in FIG. 14B (L1<L2). Accordingly, the boundary portion 64 between the rear joint portion 44 and the gearbox mounting portion 60 in the embodiment shown in FIG. 5B has a radius of curvature R1 that is larger than a radius of curvature R2 of the boundary portion 364 between the rear joint portion 344 and the gearbox mounting portion 360 in the comparative example shown in FIG. 14B (R1>R2). The boundary portion 64 in the embodiment shown in FIG. 5B has a thickness L3 that is greater than a thickness L4 of the boundary portion 364 in the comparative example shown in FIG. 14B (L3>L4).

As shown in FIG. 7, the gearbox 122 forming the rack parallel-type electric power steering 120 (see FIG. 6) is bolted to an upper surface of the gearbox mounting portion 60 (also see FIG. 5) in the side rail 26 of the suspension member 20. An alternator 124 is placed on an upper side of the gearbox 122.

<Operation and Effect>

Next, operation and effect of the embodiment will be described.

Compared with the front cross member 22 and the rear cross member 24 of the suspension member 20, the side rail 26 has a small number of components arranged in its surrounding area. Also, as shown in FIG. 7, the alternator 124 is placed on an upper side of the side rail 26. Thus, the stabilizer 100 is fixed through the stabilizer bracket 70 to the lower surface 26A of the side rail 26 of the suspension member 20 where the stabilizer 100 is less likely to interfere with other components, thereby improving mountability of the stabilizer 100 (flexibility in mounting the stabilizer 100).

The improved mountability of the stabilizer 100 enables the employment of the active stabilizer including the electrically-controlled actuator 104 as the stabilizer 100 like in the embodiment (which means an active stabilizer can be mounted easily). The rack parallel-type electric power steering 120 can also be mounted.

At the same time, as shown in FIGS. 2 and 3 and others, the middle portion 46 in the stabilizer mounting portion 30 of the side rail 26, between the front joint portion 42 at which the front end portion 72 of the stabilizer bracket 70 is joined and the rear joint portion 44 at which the rear end portion 74 is joined is thinner and thus weaker than the front joint portion 42 and the rear joint portion 44.

Accordingly, when an impact load is input to the side rail 26 in the vehicle front-rear direction, the side rail 26 is deformed around the middle portion 46. This ensures a desired impact absorbing performance of the side rail 26 even when the stabilizer bracket 70, which might prevent deformation of the side rail 26, is joined.

Thus, the embodiment improves mountability of the stabilizer 100 (flexibility in mounting the stabilizer 100) while ensuring a desired impact absorbing performance of the suspension member 20.

On the vehicle front-rear direction rear side of the rear joint portion 44 in the side rail 26 is formed the thick portion 50 that is thicker and stronger than the middle portion 46 (see FIG. 4). The formation of the thick portion 50 causes a stiffness differences between the middle portion 46 and the thick portion 50, and thus, this allows the side rail 26 to be deformed around the middle portion 46 further easily to improve the impact absorbing performance of the side rail 26.

Figure 15:
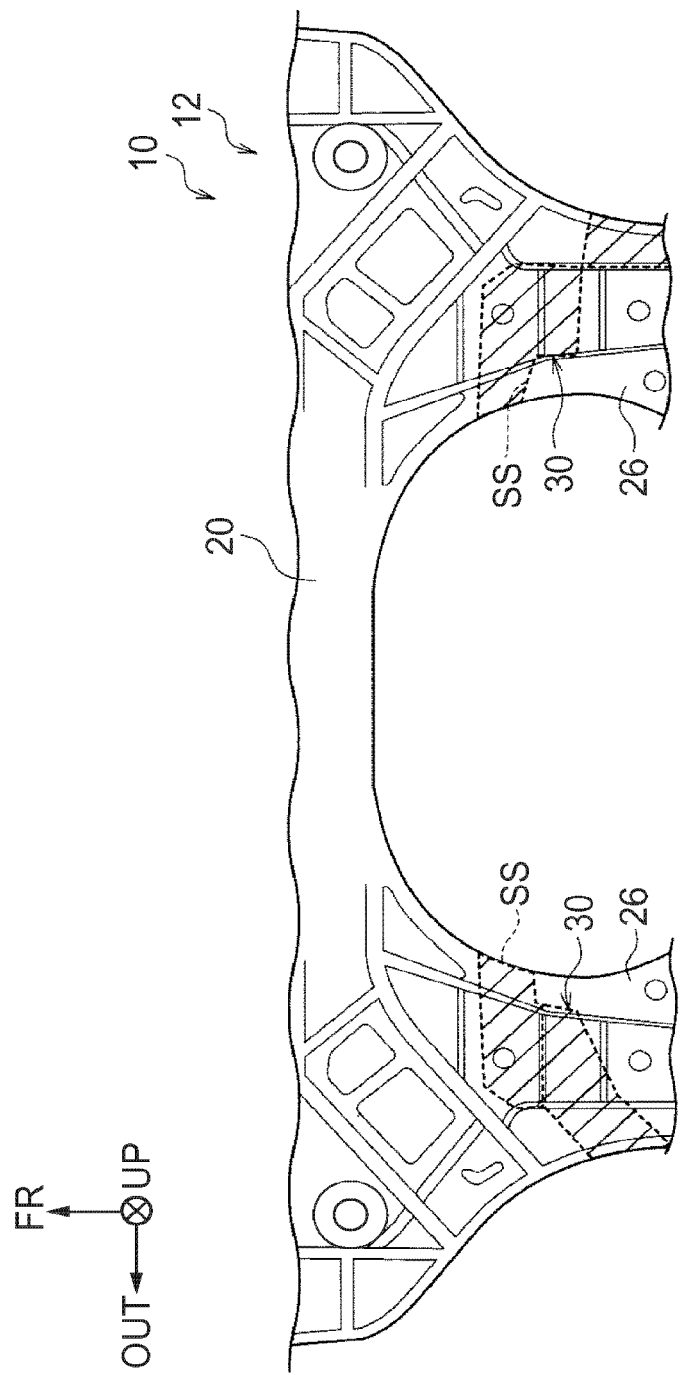
FIG. 15 is a plan view of a suspension member illustrating example broken points in side rails caused as a result of a crash test.

The vehicle 12 to which the vehicle lower section structure 10 of the embodiment is applied was subjected to various crash tests (frontal crash and small-overlap crash), and an example of results of the tests is shown in FIG. 15. A dashed line SS in the figure indicates broken areas. Like this, it has been observed that in the suspension member 20 of the embodiment, the side rail 26 is deformed and broken around the middle portion 46 to ensure a desired impact absorbing performance. Although broken areas and broken shapes and others varied with conditions of the crash tests, the side rail 26 was observed to be deformed and broken around the middle portion 46 to ensure a desired impact absorbing performance in any of the tests.

As shown in FIG. 4, while the thickness t4 of the thick portion 50 is less than the thickness t1 of the front joint portion 42 (FIG. 3A) and the thickness t2 of the rear joint portion 44 (FIG. 3C), the thick portion 50 is made wide to ensure a cross-sectional area that is needed for a desired strength. Thus, the thick portion 50 will not interfere with the tie rod end boot 110 even when the tie rod end boot 110 moves in the vehicle up-down direction. That is, the configuration ensures mountability of the tie rod end boot 110 while improving the impact absorbing performance of the side rail 26.

As shown in FIGS. 2, 3B, 9, and 10, at the vehicle width direction outer area of the middle portion 46 in the stabilizer mounting portion 30 is formed the rib portion 48 that runs in the vehicle front-rear direction and connects the front joint portion 42 (FIG. 3A) and the rear joint portion 44 (FIG. 3C). The rib portion 48 increases the strength against the load input by the stabilizer 100 via the stabilizer bracket 70 into the side rail 26 in the vehicle up-down direction.

Thus, the embodiment ensures the stabilizer mounting portion 30 a desired strength against the load (road inputs) input by the stabilizer 100 via the stabilizer bracket 70 into the side rail 26 in the vehicle up-down direction during travel on a bad road, while inhibiting prevention of the deformation of the side rail 26 caused by an impact load in the vehicle front-rear direction (which means while ensuring a desired impact absorbing performance of the suspension member 20). In other words, the side rail 26 has an improved ability to withstand vertical bending deformation caused during travel on a bad road.

Next, a description will be give of the vehicle lower section structure 310 of the comparative example to which the embodiment is not applied.

Figure 11:
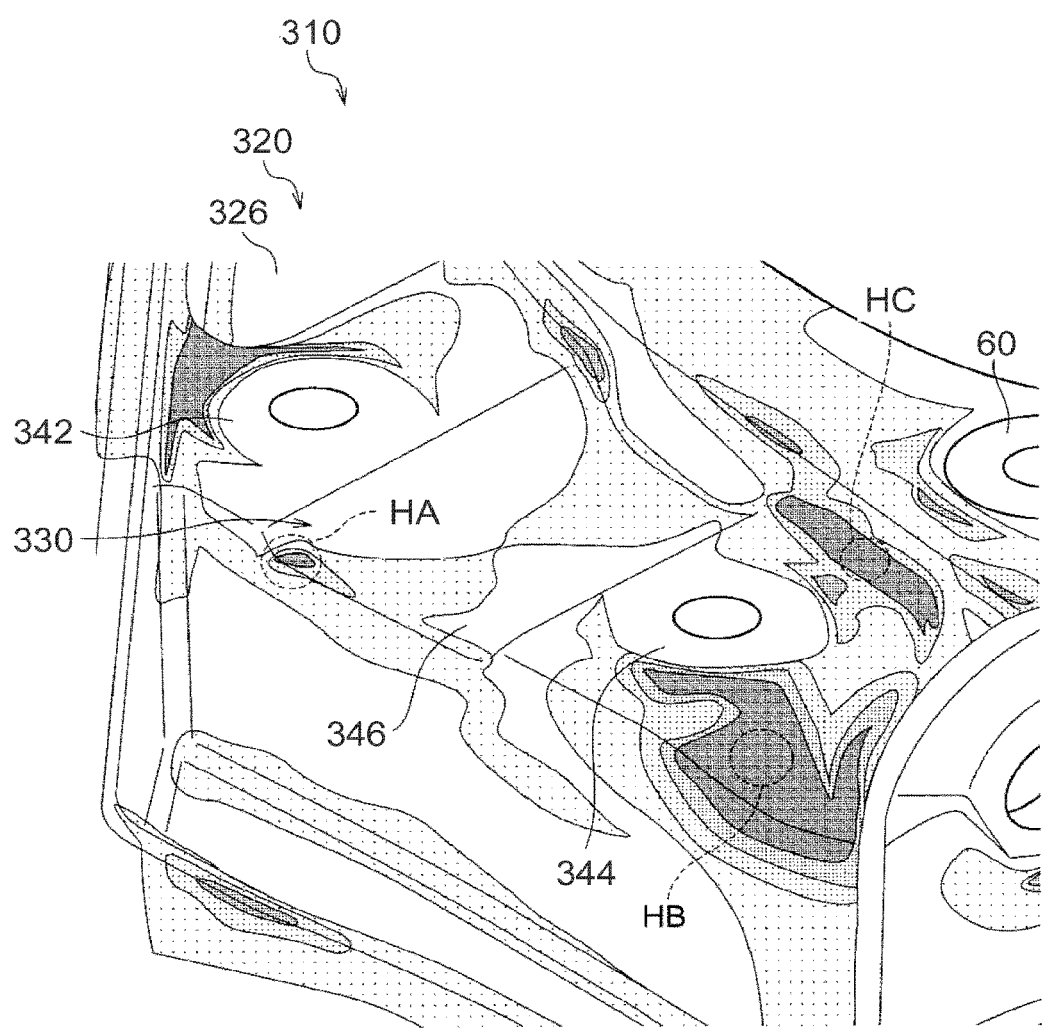
FIG. 11 shows stress distribution at a relevant portion of a side rail in a suspension member in a comparative example.
Figure 12A:
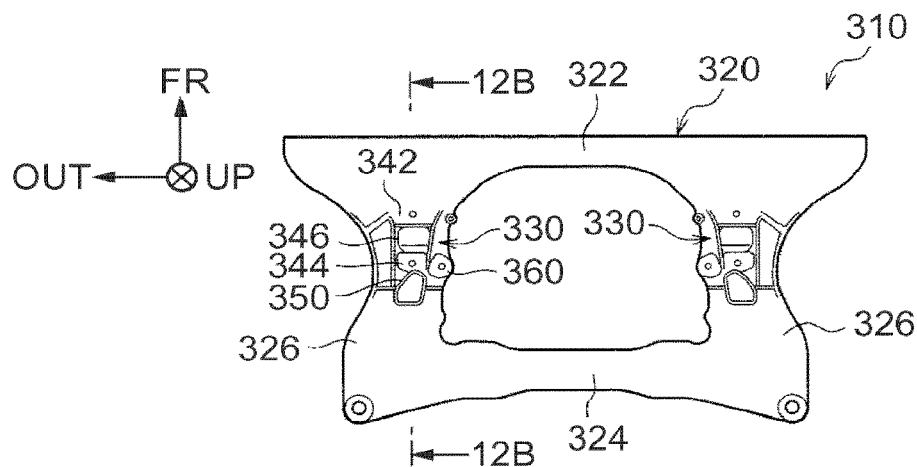
FIG. 12A is a plan view of the suspension member of the comparative example.
Figure 12B:
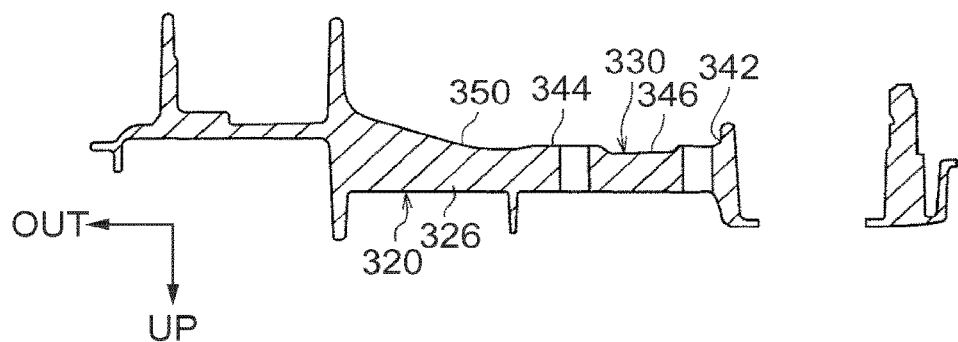
FIG. 12B is a sectional view taken along the line 12B-12B in FIG. 12A.

The vehicle lower section structure 310 in the comparative example shown in FIGS. 11, 12, and 13 has a stabilizer mounting portion 330 on the side rail 326 of the suspension member 320.

In the stabilizer mounting portion 330 of the comparative example, a front joint portion 342 to which the front end portion 72 (see FIG. 2) of the stabilizer bracket 70 is bolted, the rear joint portion 344 to which the rear end portion 74 (see FIG. 2) is bolted, and the middle portion 346 between the front joint portion 342 and the rear joint portion 344 have the same or almost the same thickness, and are thinner than the corresponding portion in the embodiment. Also, a portion 350 of the stabilizer mounting portion 330 on a rear side of the rear joint portion 344 (a portion corresponding to the thick portion 50 (FIGS. 3D and 4)) has the same or almost the same thickness as that of the front joint portion 342, the rear joint portion 344, and the middle portion 346.

Figure 13A:
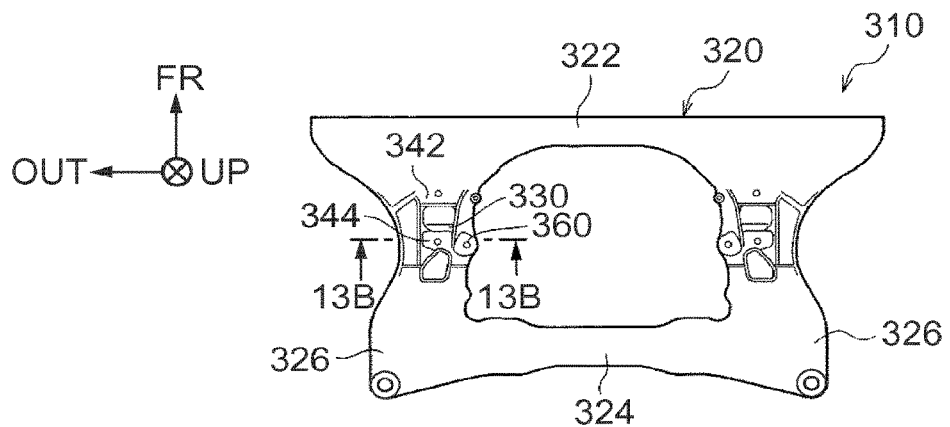
FIG. 13A is a plan view of the suspension member of the comparative example.
Figure 13B:
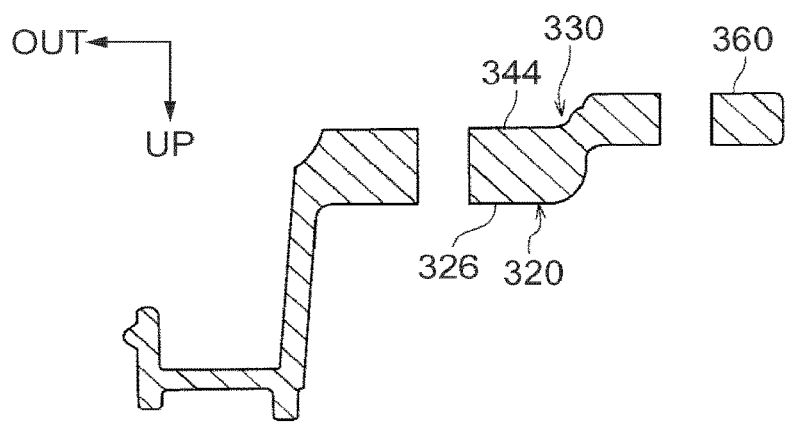
FIG. 13B is a sectional view taken along the line 13B-13B in FIG. 13A.

A cross-section (FIG. 13B) taken along the line 13B-13B in FIG. 13A corresponds to the cross-section (FIG. 3C) taken along the line 3C-3C in FIG. 2 and the cross-section (FIG. 5B) taken along the line 5B-5B in FIG. 5A.

Figure 12C:
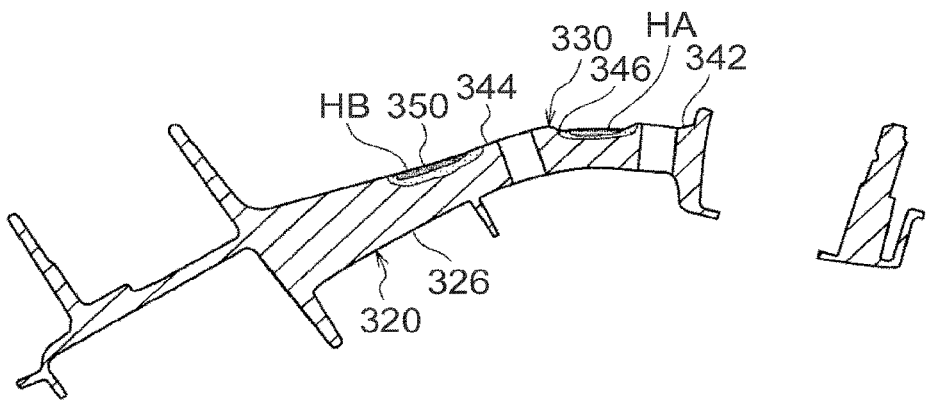
FIG. 12C is a sectional view corresponding to FIG. 12B, schematically illustrating the suspension member bent and deformed due to an input load from a stabilizer.
Figure 13C:
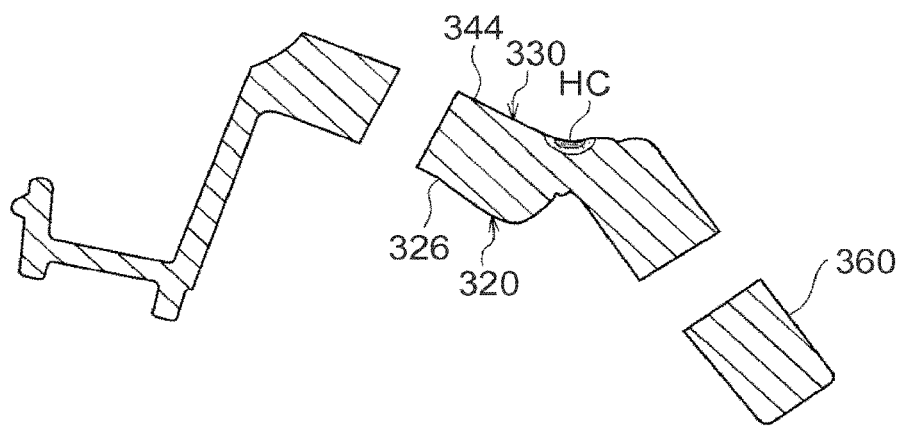
FIG. 13C is a sectional view corresponding to FIG. 13B, schematically illustrating the suspension member bent and deformed due to the input load from the stabilizer.

FIGS. 11, 12C, and 13C illustrate a bending deformation of the side rail 326 due to the load (road inputs) input by the stabilizer 100 (see FIG. 6) via the stabilizer bracket 70 into the side rail 326 of the suspension member 320 in the vehicle up-down direction during, for example, travel on a bad road, and also illustrate an example stress distribution at the bending deformation. Higher density of the dots means higher stress. Portions subjected to great deformation and high stress are called a high-stress portion HA, a high-stress portion HB, and a high-stress portion HC. In FIGS. 12C and 13C, the amount of the vertical bending deformation of the side rail 326 is illustrated in an exaggerated manner for ease of understanding.

Portions of the side rail 26 in the suspension member 20 of the embodiment that correspond to the high-stress portion HA, the high-stress portion HB, and the high-stress portion HC are illustrated in FIGS. 2, 5, and 10. FIG. 10 corresponds to FIG. 11 of the comparative example and illustrates stress distribution at the vertical bending deformation.

The high-stress portion HA of the embodiment has the rib portion 48 (see FIGS. 2, 3B, 9, and 10) formed in the vehicle front-rear direction to have increased strength over that in the comparative example. Similarly, the high-stress portion HB has the thick portion 50 to have increased strength over that in the comparative example (see FIGS. 3D and 4). The increased strengths suppress the vertical bending deformation in the high-stress portion HA and the high-stress portion HB in the side rail 26 in the suspension member 20 of the embodiment during travel on a bad road, and reduces the stress as shown in FIG. 10 (see and compare FIGS. 10 and 11).

Moreover, the radius of curvature R1 of the boundary portion 64 of the high-stress portion HC in the embodiment shown in FIG. 5B is larger than the radius of curvature R2 of a boundary portion 364 in the comparative example shown in FIG. 14, and the thickness L3 of the boundary portion 64 in the embodiment shown in FIG. 5B is greater than the thickness L4 of the boundary portion 364 in the comparative example shown in FIG. 14B (L3>L4). Accordingly, the boundary portion 64 of the high-stress portion HC in the embodiment has increased strength over the boundary portion 364 of the high-stress portion HC in the comparative example. This inhibits the vertical bending deformation of the high-stress portion HC in the side rail 26 in the suspension member 20 of the embodiment during travel on a bad road to reduce the stress as shown in FIG. 10 (see and compare FIGS. 10 and 11).

Furthermore, the embodiment allows the stabilizer 100 (active stabilizer) including the electrically-controlled actuator 104 and the rack parallel-type electric power steering 120 to be mounted as shown in FIG. 6, while ensuring the boundary portion 64 the desired strength as shown in FIG. 5. In addition, the embodiment ensures a clearance into which an alternator mounting tool for mounting the alternator 124 is inserted as shown in FIG. 7.

The stresses applied to the high-stress portions HA, HB, HC in the side rail 26 in the suspension member 20 of the embodiment (see FIG. 10) have been observed to be reduced from the stresses applied to the high-stress portions HA, HB, HC in the side rail 326 in the suspension member 320 of the comparative example (see FIG. 11) by 48%, 25%, and 48%, respectively.

Because the deformation in the side rail 26 of the suspension member 20 is inhibited like this and the rib portion 48 ensures the stabilizer mounting portion 30 the desired strength as described above, a stabilizer 100 having a high roll stiffness can be used. That is, the embodiment can use a stabilizer 100 having a high roll stiffness while ensuring a desired impact absorbing performance of the suspension member 20.

The use of the stabilizer 100 having the high roll stiffness improves the roll stiffness of the vehicle 12. It has been observed in simulation that the vehicle 12 having the suspension member 20 to which the high roll stiffness stabilizer 100 is secured increases roll stiffness over that of a vehicle having the suspension member 320 of the comparative example to which a low stiffness stabilizer is secured, by about 1.4 times.

The suspension member 20 of the embodiment is formed by a casting of an alloy mainly containing aluminum. This makes it easy to form the thin middle portion 46, the rib portion 48, the thick portion 50, and the thick boundary portion 64 that have been described. Even though the rib portion 48, the thick portion 50, and the thick boundary portion 64 are formed at the areas respectively corresponding to the high-stress portion HA, the high-stress portion HB, and the high-stress portion HC to ensure the desired cross-sectional areas (strength), the embodiment still meets production technique requirements (casting requirements) of the suspension member 20.

The invention is not limited to the embodiment.

While in the embodiment, the rib portion 48 is formed in the vehicle front-rear direction on the vehicle width direction outer side of the middle portion 46 in the stabilizer mounting portion 30 of the side rail 26 of the suspension member 20 to connect the front joint portion 42 and the rear joint portion 44, the vehicle lower section structure is not limited to the configuration. For example, a separate reinforcing member may be joined to connect the front joint portion 42 and the rear joint portion 44.

While in the embodiment, the entire middle portion 46 between the front joint portion 42 and the rear joint portion 44 in the stabilizer mounting portion 30 of the side rail 26 of the suspension member 20 is made thin to be weakened. However, the vehicle lower section structure is not limited to this. For example, the middle portion 46 may be made thin partially to provide a low-strength portion between the front joint portion 42 and the rear joint portion 44. Alternatively, the middle portion 46 may be weakened by methods other than by reducing the thickness. For example, the middle portion 46 may have one or a plurality of holes to be weakened.

While in the embodiment, the thick portion 50 is formed at the high-stress portion HB on the rear side of the rear joint portion 44 of the stabilizer mounting portion 30, the vehicle lower section structure is not limited to this. For example, a separate plate member may be joined to the high-stress portion HB.

While in the embodiment, the stabilizer 100 is secured to the lower surface 26A of the side rail 26 of the suspension member 20 via the stabilizer bracket 70, the stabilizer 100 may be secured to the upper surface of the side rail 26 via the stabilizer bracket 70.

While in the embodiment, the technique disclosed in the invention is applied to the suspension member 20 at the lower front portion of the vehicle 12, the technique disclosed in the invention may be applied to a rear suspension member provided at a rear portion of the vehicle 12. In this case, the thick portion 50 is provided on a vehicle front-rear direction front side of the front joint portion 42 so that the side rail 26 is easily deformed and broken around the middle portion 46 by a rear crash.

While the embodiment is a suspension member 20 that has a generally rectangular frame-like shape in a plan view, the technique disclosed in the invention is not limited to this. For example, the technique disclosed in the invention may be applied to a suspension member that includes a cross member and side rails on the right and left of the cross member to have a generally H-shape in a plan view.

Because the positions of the high-stress portions HA, HB, HC generated during, for example, travel on a bad road vary with the shape of the suspension member, the rib portion 48, the thick portion 50, and the thick boundary portion 64 may be formed appropriately at the positions of the high-stress portion HA, the high-stress portion HB, and the high-stress portion HC, respectively.

What is claimed is:

1. A vehicle lower section structure, comprising:
a suspension member including a side rail extending in a vehicle front-rear direction, the side rail including a front joint portion and a rear joint portion, the front joint portion being disposed on a front side of the rear joint portion in the vehicle front-rear direction;
a securing member joined to the side rail at the front joint portion and the rear joint portion; and
a stabilizer secured to the side rail by the securing member, wherein
the side rail includes a low-strength portion provided between the front joint portion and the rear joint portion,
the low-strength portion has a strength lower than a strength of the front joint portion and the rear joint portion,
the side rail includes a reinforcing portion that connects the front joint portion and the rear joint portion, and
the reinforcing portion includes a rib with a concavely curved profile protruding upward.

2. The vehicle lower section structure according to claim 1, wherein
the securing member is joined to the front joint portion at a front end portion of the securing member in the vehicle front-rear direction, and to the rear joint portion at a rear end portion of the securing member in the vehicle front-rear direction.

3. The vehicle lower section structure according to claim 1, wherein
the suspension member is a casting of a metal mainly containing aluminum.

4. The vehicle lower section structure according to claim 1, wherein
the stabilizer is secured to a lower surface of the side rail in a vehicle up-down direction, by the securing member.

5. The vehicle lower section structure according to claim 1, wherein
the side rail includes a high-strength portion provided on a rear side of the rear joint portion in the vehicle front-rear direction or a front side of the front joint portion in the vehicle front-rear direction,
the high-strength portion has a strength higher than the low-strength portion.

6. The vehicle lower section structure according to claim 5, wherein
a width of the side rail in a vehicle up-down direction is larger at the rear joint portion and the front joint portion than at the high-strength portion.

7. The vehicle lower section structure according to claim 1, wherein
the stabilizer is an active stabilizer including a main body and an electrically-controlled actuator.

8. The vehicle lower section structure according to claim 1, wherein
the suspension member includes a cross member extending in a vehicle width direction.

9. The vehicle lower section structure according to claim 1, wherein
the suspension member includes a second side rail, the side rail and the second side rail sandwiching a center of the vehicle in a vehicle width direction, and
the stabilizer is secured to the second side rail.

10. The vehicle lower section structure according to claim 1, wherein
the reinforcing portion is formed at a vehicle width direction outer area of the low-strength portion in the side rail.

11. A vehicle lower section structure, comprising:
a suspension member including a side rail extending in a vehicle front-rear direction, the side rail including a front joint portion and a rear joint portion , the front joint portion being disposed on a front side of the rear joint portion in the vehicle front-rear direction;
a securing member joined to the side rail at the front joint portion and the rear joint portion; and
a stabilizer secured to the side rail by the securing member, wherein
the side rail includes a low-strength portion provided between the front joint portion and the rear joint portion,
the low-strength portion has a strength lower than a strength of the front joint portion and the rear joint portion,
the side rail includes a high-strength portion provided on a rear side of the rear joint portion in the vehicle front-rear direction or a front side of the front joint portion in the vehicle front-rear direction, the high-strength portion has a strength higher than the low-strength portion, the high-strength portion has a thickness greater than a thickness of the low-strength portion, and the side rail includes a rib with a concavely curved profile protruding upward that connects the front joint portion and the rear joint portion.

12. The vehicle lower section structure according to claim 11, wherein the securing member is joined to the front joint portion at a front end portion of the securing member in the vehicle front-rear direction, and to the rear joint portion at a rear end portion of the securing member in the vehicle front-rear direction.

13. The vehicle lower section structure according to claim 11, wherein the suspension member is a casting of a metal mainly containing aluminum.

14. The vehicle lower section structure according to claim 11, wherein the stabilizer is secured to a lower surface of the side rail in a vehicle up-down direction, by the securing member.

15. A vehicle lower section structure, comprising:

a suspension member including a side rail extending in a vehicle front-rear direction, the side rail including a front joint portion and a rear joint portion, the front joint portion being disposed on a front side of the rear joint portion in the vehicle front-rear direction;

a securing member joined to the side rail at the front joint portion and the rear joint portion; and a stabilizer secured to the side rail by the securing member, wherein the side rail includes a low-strength portion provided between the front joint portion and the rear joint portion, the low-strength portion has a strength lower than a strength of the front joint portion and the rear joint portion, the side rail includes a high-strength portion provided on a rear side of the rear joint portion in the vehicle front-rear direction or a front side of the front joint portion in the vehicle front-rear direction, and a width of the side rail in a vehicle up-down direction is larger at the rear joint portion and the front joint portion than at the high-strength portion.

16. The vehicle lower section structure according to claim 15, wherein the securing member is joined to the front joint portion at a front end portion of the securing member in the vehicle front-rear direction, and to the rear joint portion at a rear end portion of the securing member in the vehicle front-rear direction.

17. The vehicle lower section structure according to claim 15, wherein the side rail includes a reinforcing portion that connects the front joint portion and the rear joint portion.

18. The vehicle lower section structure according to claim 15, wherein the suspension member is a casting of a metal mainly containing aluminum.

19. The vehicle lower section structure according to claim 15, wherein the stabilizer is secured to a lower surface of the side rail in a vehicle up-down direction, by the securing member.

* * * * *